(12) United States Patent
Jeong et al.

(10) Patent No.: US 8,149,676 B2
(45) Date of Patent: Apr. 3, 2012

(54) APPARATUS AND METHOD FOR RECORDING/REPRODUCING HOLOGRAPHIC DATA AND HOLOGRAPHIC DATA STORAGE MEDIUM

(75) Inventors: Taek-seong Jeong, Suwon-si (KR); Jae-cheol Bae, Suwon-si (KR); Tatsuhiro Otsuka, Suwon-si (KR); Hyun-soo Park, Seoul (KR); Young-min Cheong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 749 days.

(21) Appl. No.: 12/109,619

(22) Filed: Apr. 25, 2008

(65) Prior Publication Data
US 2009/0073851 A1    Mar. 19, 2009

(30) Foreign Application Priority Data

Sep. 17, 2007    (KR) .................. 10-2007-0094250

(51) Int. Cl.
*G11B 7/00*    (2006.01)
(52) U.S. Cl. ............. 369/103; 369/112.1; 369/112.15; 369/283; 369/44.23
(58) Field of Classification Search .................. None
See application file for complete search history.

(56) References Cited

U.S. PATENT DOCUMENTS

| | | | |
|---|---|---|---|
| 7,738,152 B2 * | 6/2010 | Butler et al. ............. 359/30 |
| 2004/0027968 A1 * | 2/2004 | Horimai ............. 369/103 |
| 2004/0174797 A1 * | 9/2004 | Tsukagoshi ............. 369/103 |
| 2006/0181977 A1 | 8/2006 | Heor |
| 2006/0227396 A1 * | 10/2006 | Sugimoto et al. ............. 358/521 |
| 2006/0227398 A1 * | 10/2006 | Lawrence et al. ............. 359/15 |
| 2008/0117788 A1 * | 5/2008 | Kasazumi et al. ............. 369/103 |
| 2008/0170486 A1 * | 7/2008 | Sato et al. ............. 369/112.05 |
| 2008/0285395 A1 * | 11/2008 | Tanaka et al. ............. 369/44.23 |

FOREIGN PATENT DOCUMENTS

| | | |
|---|---|---|
| KR | 2002-77771 | 10/2002 |
| KR | 2006-17372 | 2/2006 |
| WO | WO 2004/112045 | 12/2004 |
| WO | WO 2006/093305 A1 | 9/2006 |
| WO | WO2007026483 * | 3/2007 |

OTHER PUBLICATIONS

International Search Report and Written Opinion issued in corresponding International Application No. PCT/KR2008/002846 dated Oct. 29, 2008.
Chinese Office Action issued on Mar. 23, 2011, in corresponding Chinese Application No. CN 200880107364.2 (10 pages).

* cited by examiner

*Primary Examiner* — Joseph Haley
*Assistant Examiner* — Ifedayo Iluyomade
(74) *Attorney, Agent, or Firm* — NSIP Law

(57) ABSTRACT

A method and apparatus for recording and/or reproducing holographic data and a holographic information storage medium, wherein the apparatus for recording and/or reproducing holographic information includes an optical pickup emitting light onto a holographic information storage medium and receiving the emitted light. The optical pickup includes: a light source unit emitting a signal beam and a reference beam in a recording mode; and a focusing optical system focusing the signal beam and the reference beam on one focal point in the holographic information storage medium so that information can be recorded by using an interference pattern formed along a depth direction of the holographic information storage medium in the vicinity of the focal point, wherein the numerical aperture of the focusing optical system for the signal beam is different from the numerical aperture of the focusing optical system for the reference beam.

21 Claims, 6 Drawing Sheets

APPARATUS AND METHOD FOR RECORDING/REPRODUCING HOLOGRAPHIC DATA AND HOLOGRAPHIC DATA STORAGE MEDIUM

CROSS-REFERENCE TO RELATED APPLICATION

This application claims the benefit of Korean Patent Application No. 2007-94250, filed on Sep. 17, 2007, in the Korean Intellectual Property Office, the disclosure of which is incorporated herein in its entirety by reference.

BACKGROUND OF THE INVENTION

1. Field of the Invention

An aspect of the present invention relates to a method and apparatus for recording and/or reproducing holographic data and a holographic information storage medium, and more particularly, to a microholography-type method and apparatus for recording and/or reproducing holographic data in which the amount of aberration is reduced, and a holographic information storage medium.

2. Description of the Related Art

Information storage technology using holograms has been recently highlighted. In the information storage method using holograms, information is stored in the form of an optical interference pattern in an inorganic crystal or polymer material sensitive to light. The optical interference pattern is formed by using two coherent laser beams. That is, an interference pattern which is formed when a reference beam and a signal beam having different paths interfere with each other causes chemical or physical changes in a photosensitive storage medium, thereby recording the interference pattern in the medium.

In order to reproduce information from the thus recorded interference pattern, a reference beam similar to the beam used when the information is recorded is emitted to the interference pattern recorded in the storage medium. This causes diffraction by the interference pattern, thereby restoring a signal beam and reproducing the information.

This hologram information storage technology includes a volume holographic method in which information is recorded and/or reproduced in units of pages by using volume holography, and a microholographic method in which information is recorded and/or reproduced in units of single bits by using microholography. Although the volume holographic method has an advantage in that a large amount of information can be processed at the same time, it is difficult for the method to be commercialized as an information storage apparatus for general consumers because the optical system needs to be adjusted very precisely.

In the microholographic method, two condensed light beams are made to interfere with each other at the focal point, and by moving this interference pattern on the plane of a storage medium, a plurality of patterns are recorded to form a recording layer. By superimposing the recording layers in a depth direction of the storage medium, patterns are recorded, thereby recording information in a 3-dimensional (3D) manner.

A conventional microholography-type apparatus for recording and/or reproducing holographic information uses an optical system having identical numerical apertures for a signal beam and a reference beam so that the signal beam and the reference beam have the same spot size. However, when the numerical aperture of the optical system is increased in order to increase a recording capacity, it becomes very sensitive to movements, such as tilting, and the aberration to be compensated becomes too big, thereby complicating the optical system and increasing manufacturing costs.

SUMMARY OF THE INVENTION

An aspect of the present invention provides an apparatus for recording and/or reproducing holographic information in which a numerical aperture of an optical system for focusing a signal beam and a numerical aperture of an optical system for focusing a reference beam are different from each other, thereby controlling the occurrence of aberration even when the recording capacity is increased, and a method of recording and/or reproducing holographic information using the holographic information recording and/or reproducing apparatus, and a holographic information storage medium used in the holographic information recording and/or reproducing apparatus.

According to an aspect of the present invention, there is provided a holographic information recording and/or reproducing apparatus comprising an optical pickup emitting light to a holographic information storage medium and receiving the emitted light, wherein the optical pickup includes a light source unit emitting a signal beam and a reference beam in a recording mode; and a focusing optical system focusing the signal beam and the reference beam on one focal point on the holographic information storage medium so that information can be recorded using an interference pattern formed along a depth direction of the holographic information storage medium in a vicinity of the focal point, and in the focusing optical system, a numerical aperture for the signal beam being different from a numerical aperture of the reference beam.

According to another aspect of the present invention, there is provided a holographic information recording and/or reproducing method of recording information on a holographic information storage medium and reproducing recorded information, the method including: in a recording mode, generating a signal beam and a reference beam, focusing the generated signal beam and the reference beam on one focal point of the holographic information storage medium; and recording information by using an interference pattern formed in a depth direction of the holographic information storage medium and in a vicinity of the focal point, wherein a numerical aperture of the signal beam is different from a numerical aperture of the reference beam.

According to another aspect of the present invention, there is provided a holographic information storage medium including: a first transparent substrate; a second transparent substrate; and a recording layer disposed between the first and second transparent layer and formed by a photoresist material on which holographic information is recorded, wherein the thickness of the second transparent substrate is less than that the thickness of the first transparent substrate.

According to another aspect of the present invention, the holographic information recording and/or reproducing apparatus and method, and the holographic information storage medium control the aberration even when the recording capacity is increased, thereby reducing the complexity of the optical system and lowering the manufacturing cost so that general consumers can use the apparatus, the method, and the medium.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages of the present invention will become more apparent by describing in detail general aspects thereof with reference to the attached drawings in which.

DETAILED DESCRIPTION OF THE EMBODIMENTS

Figure 1:
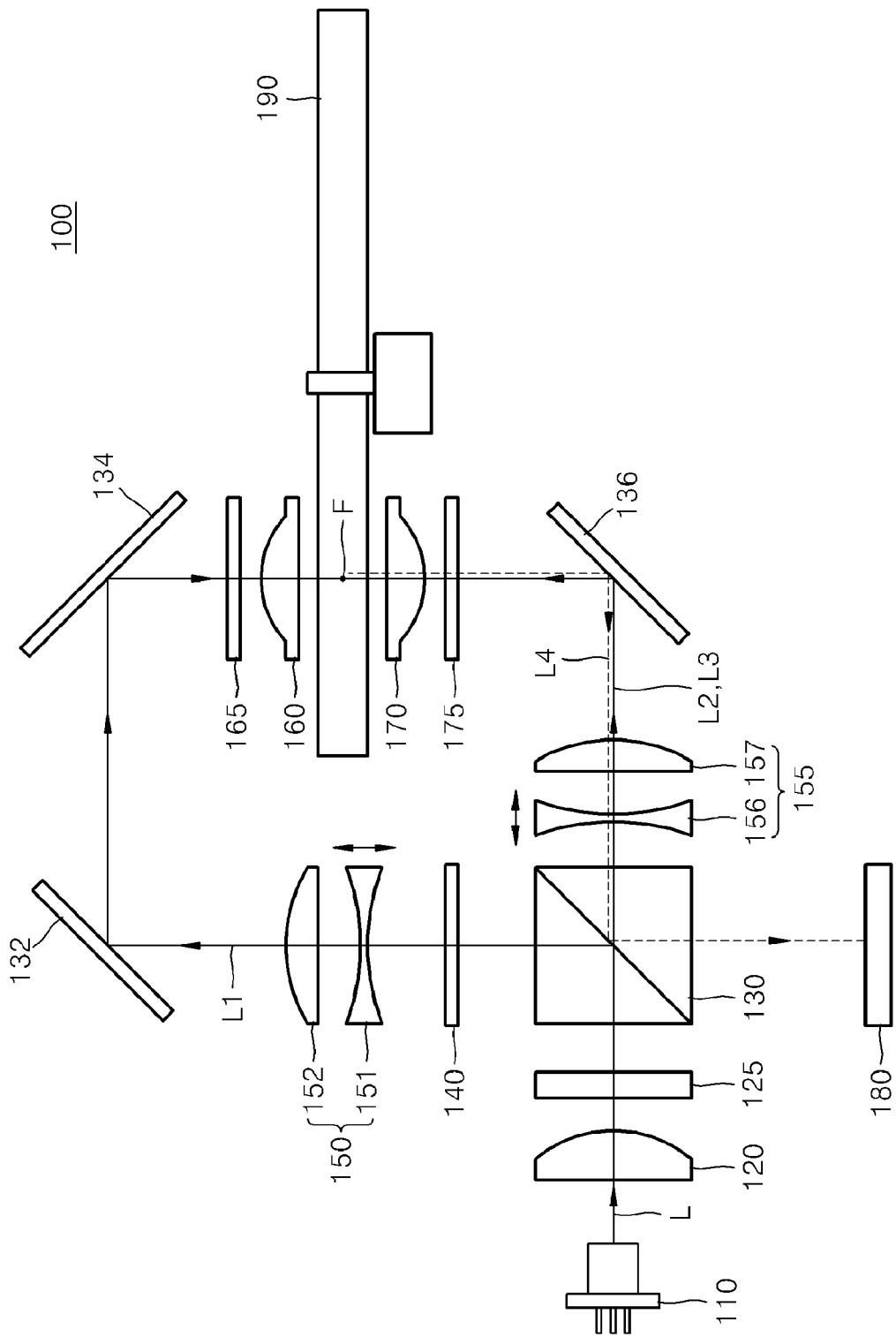
FIG. 1 is a schematic diagram illustrating an apparatus for recording and/or reproducing holographic information according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The present invention will now be described more fully with reference to the accompanying drawings, in which general aspects of the invention are shown. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. In the drawings, the thicknesses of layers and regions are exaggerated for clarity. Like reference numerals in the drawings denote like elements, and thus their description will be omitted.

Figure 2:
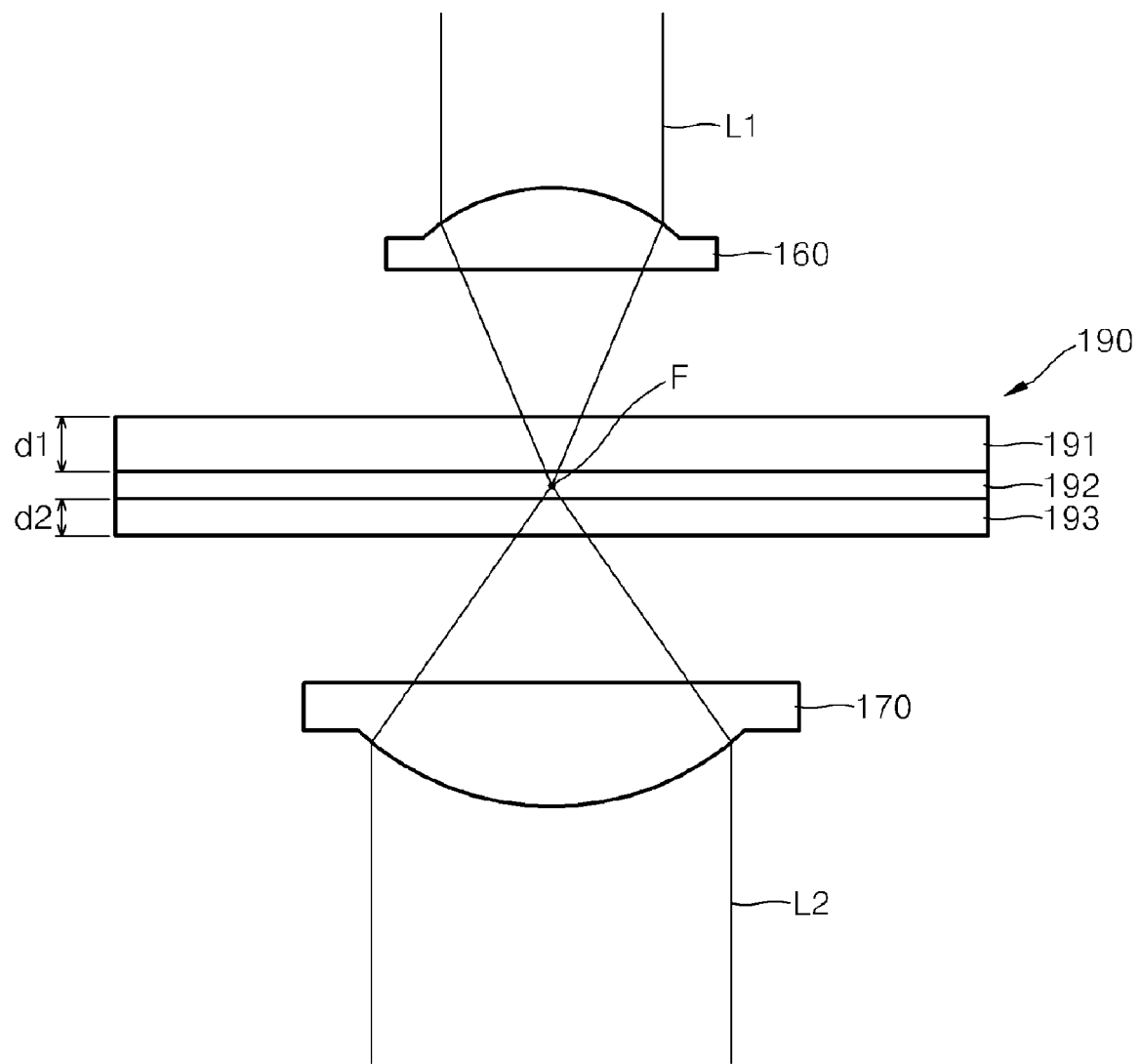
FIG. 2 is a schematic diagram illustrating an optical structure in which a signal beam and a reference beam are emitted onto a holographic information storage medium illustrated in FIG. 1 according to an embodiment of the present invention.

FIG. 1 is a schematic diagram illustrating an apparatus for recording and/or reproducing holographic information according to an embodiment of the present invention, and FIG. 2 is a schematic diagram illustrating an optical structure in which a signal beam and a reference beam are emitted to a holographic information storage medium illustrated in FIG. 1 according to an embodiment of the present invention.

Referring to FIG. 1, the holographic information recording and/or reproducing apparatus records information on a holographic information storage medium 190, and reproduces the recorded information. The apparatus includes an optical pickup 100 emitting light to the holographic information storage medium 190 and receiving the emitted light, and a circuit unit (not shown).

The optical pickup 100 further includes a light source 110, an optical path change device 130 splitting a light beam emitted from the light source 110 into a signal beam (L1) and a reference beam (L2), a first object lens 160 focusing the signal beam (L1) on the holographic information storage medium 190, a second object lens 170 focusing the reference beam (L2) on the holographic information storage medium 190, and an optical detector 180 detecting a reproduction beam (L4) reflected from the holographic information storage medium 190. Also, the optical pickup 100 may further include a first relay lens unit 150 and a second relay lens unit 155 changing the focal point location. Also, the optical pickup 100 may further include a collimating lens 120 modifying a light beam emitted from the light source 110 into a collimated beam, and first through third mirrors 132, 134, and 136 appropriately folding an optical path. Furthermore, a servo optical system (not shown) for performing a servo function may be further disposed in the optical pickup 100.

The light source 110 and the optical path change device 130 form a light source unit emitting light for recording and/or reproducing.

As the light source 110, for example, a blue-ray laser diode can be employed.

The light source 110 emits light which is modulated according to information in a recording mode, and emits light which is not modulated in a reproduction mode.

The collimating lens 120 modifies the recording and/or reproducing light (L) emitted in the light source 110 into a collimated light beam. In the current embodiment, the collimating lens 120 is disposed between the light source 110 and a polarization conversion device 125, but the location at which the collimating lens 120 is installed is not limited to this.

In general, the semiconductor laser diode employed as the light source 110 mainly emits laser light having a single polarization component, and in this case, the polarization conversion device 125 may be disposed between the light source 110 and the optical path change device 130. As the polarization conversion device 125, an active wave plate, such as an active half wave plate or an active quarter wave plate may be employed.

If the active half wave plate is employed as the polarization conversion device 125, and if the angle between the polarization direction of incident predetermined linear polarization light and the optical axis, and a fast axis in particular, of the active half wave plate is at an angle other than 45 degrees, when the light passes through the active half wave plate, the polarization direction of the incident light, for example, the incident light of P polarization, is rotated. The rotated incident light thereby changes into light having two linear polarization components perpendicular to each other, that is, an S polarization component and a P polarization component. The S polarization component and the P polarization component of the light whose polarization direction is thus rotated respectively correspond to the signal beam (L1) and the reference beam (L2), in a recording mode. In this way, the signal beam (L1) and the reference beam (L2) are two polarization components perpendicular to each other, and are split in the optical path change device 130, and emitted to the holographic information storage medium 190 along respective separate optical paths.

If the active quarter wave plate is employed as the polarization conversion device 125, incident predetermined linear polarization light is polarization-converted into circular polarization light. Since this circular polarization light has two linear polarization components perpendicular to each other, the polarization components can be employed as the signal beam (L1) or the reference beam (L2), respectively. This polarization conversion device 125 may be an active type which performs a polarization conversion function in a recording mode and does not perform the polarization conversion function in a reproducing mode. In the reproducing mode, all the light emitted from the light source 110 can be used as a reproduction beam. The holographic information recording and/or reproducing apparatus according to the current embodiment is a microholography type in which an interference pattern formed by the interference between the signal beam (L1) and the reference beam (L2) contains a single bit of information at each focal point, and the light emitted from the light source 110 is modulated one bit at a time and emitted. Accordingly, since both, the signal beam (L1) and the reference beam (L2) include recording information and are not significantly different from each other in the recording process, the terms may be exchanged and used. For convenience of explanation, the light beam using the path of a reproduction beam (L3) incident on the holographic information storage medium 190 will be referred to as the reference beam (L2)

As the optical path change device 130, a polarization beam splitter is used, in which according to the polarization direction, transmission and reflection of light change can be employed. For example, the optical path change device 130 may transmit incident P polarization light without any change and reflect incident S polarization light. The optical path change device 130 also performs a function of separating the reproduction light (L3) incident on the holographic information storage medium 190 and the reproduction light (L4) reflected from the holographic information storage medium 190 in a reproduction mode. Since the polarization direction of the reproduction light (L3) incident on the holographic information storage medium 190 changes to the polarization direction of the reproduction light (L4) reflected from the holographic information storage medium 190 and the polarization directions are different from each other as will be explained later, the reproduction light (L3) and the reproduction light (L4) can be separated in the optical path change device 130.

An optical detector 180 is disposed on one side of the optical path change device 130 and detects the reproduction light (L4) separated in the optical path change device 130.

The signal beam (L1) and the reference beam (L2) split in the optical path change device 130 are incident on the holographic information storage medium 190 through a focusing optical system. Since the holographic information storage medium 190 according to the current embodiment is a transmission-type medium in which the signal beam (L1) and the reference beam (L2) are incident on both surfaces, the focusing optical system is divided into a first focusing optical system focusing the signal beam (L1) and a second focusing optical system focusing the reference beam (L2). The first focusing optical system focusing the signal beam (L1) includes a shutter 140, a first relay lens unit 150, a first and second mirror 132 and 134, a first active quarter wave plate 165, and a first object lens 160. The second focusing optical system focusing the reference signal (L2) includes a second relay lens unit 155, a third mirror 136, a second active quarter wave plate 175, and a second object lens 170.

The signal beam (L1) branches off in the optical path change unit 130, travels through the shutter 140, the first relay lens unit 150, and the first and second mirror 132 and 134, and is focused in the first object lens 160, thereby being incident on one surface of the holographic information storage medium 190. Also, the reference beam (L2) branches off in the optical path change unit 130, travels through the second relay lens unit 155, and the third mirror 136, and is focused in the second object lens 170, thereby being incident on the other surface of the holographic information storage medium 190. In this case, the numerical aperture of the first focusing optical system is made to be smaller than the numerical aperture of the second focusing optical system. For example, the numerical aperture of the first object lens 160 is made to be smaller than the numerical aperture of the second object lens 170. By making the numerical aperture for the signal beam (L1) smaller than that of the reference beam (L2), a bigger tolerance for the optical system can be achieved as will be explained later. In the current embodiment, the numerical aperture of the first focusing optical system is made to be smaller than the numerical aperture of the second focusing optical system, but the aspects of the present invention are not limited to this particular embodiment, and the numerical aperture of the first focusing optical system may be made to be larger than the numerical aperture of the second focusing optical system.

The shutter 140 passes light in a recording mode, and blocks light in a reproduction mode.

The first and second relay lens units 150 and 155 vary the position of a focal point so that a holographic interference pattern can be superimposed and recorded in the depth direction of a recording layer 192 illustrated in FIG. 2 of the holographic information storage medium 190. For example, the first relay lens unit 150 includes a first and second relay lens 151 and 152, and is constructed so that the first relay lens 151 is mechanically driven to move along an optical axis, thereby changing the position of the focal point of the signal beam (L1). Also, the second relay lens unit 155 includes a third and fourth relay lens 156 and 157, and is constructed so that the third relay lens 156 is mechanically driven to move along an optical axis, thereby changing the position of the focal point of the reference beam (L2).

Referring to FIG. 2, a holographic information storage medium according to an embodiment of the present invention and an optical structure in which a signal beam and a reference beam are emitted onto the holographic information storage medium, are illustrated. The holographic information storage medium 190 is a transmission-type medium having a transmission-type structure in which a first and second transparent substrate 191 and 193, and a recording layer 192 between the first and second transparent substrate 191 and 193 are disposed.

The recording layer 192 is formed by laminating a photoresist material such as a photo polymer having a predetermined thickness. This photoresist material is a material whose refractive index changes if light is absorbed, and in general, the refractive index changes in proportion to the strength of light. The photoresist material may have a nonlinear characteristic in which the photoresist material has a predetermined threshold in terms of the strength of light and responds only to light stronger than the threshold. This is because the spot sizes of the signal beam (L1) and the reference beam (L2) vary and a recording density may decrease as will be explained later. Accordingly, if recording is only performed by light stronger than the threshold in a location in which the spot of the signal beam (L1) and the spot of the reference beam (L2) overlap, reduction of the recording density can be controlled. Also, the focal points of the signal beam (L1) and the reference beam (L2) focused by the first and second object lens 160 and 170, respectively, can be varied. A plurality of interference patterns different from each other can be superimposed and formed at focal point locations different from each other in the depth direction of the recording layer 192. If the material of the recording layer 192 has a nonlinear characteristic, the strength of the interference pattern rapidly weakens as the distance from the focal point location increases, and dense multilayer recording can be performed. Between the first transparent substrate 191 and the recording layer 192, or between the second transparent substrate 193 and the recording layer 192, a servo layer (not shown) containing servo information may be further disposed.

As the numerical aperture of the first object lens 160 at the signal beam (L1) side is different from the numerical aperture of the second object lens 170, the thickness of the first transparent substrate 191 may be different from the thickness of the second transparent substrate 193. In particular, by making the numerical aperture of the first object lens 160 focusing the signal beam (L1) smaller than the numerical aperture of the second object lens 170 focusing the reference beam (L2), the thickness (d1) of the first transparent substrate 191 can be made to be greater than the thickness (d2) of the second transparent substrate 193, and a bigger tolerance for a numerical aperture occurring in the optical system can be secured.

Figure 3:
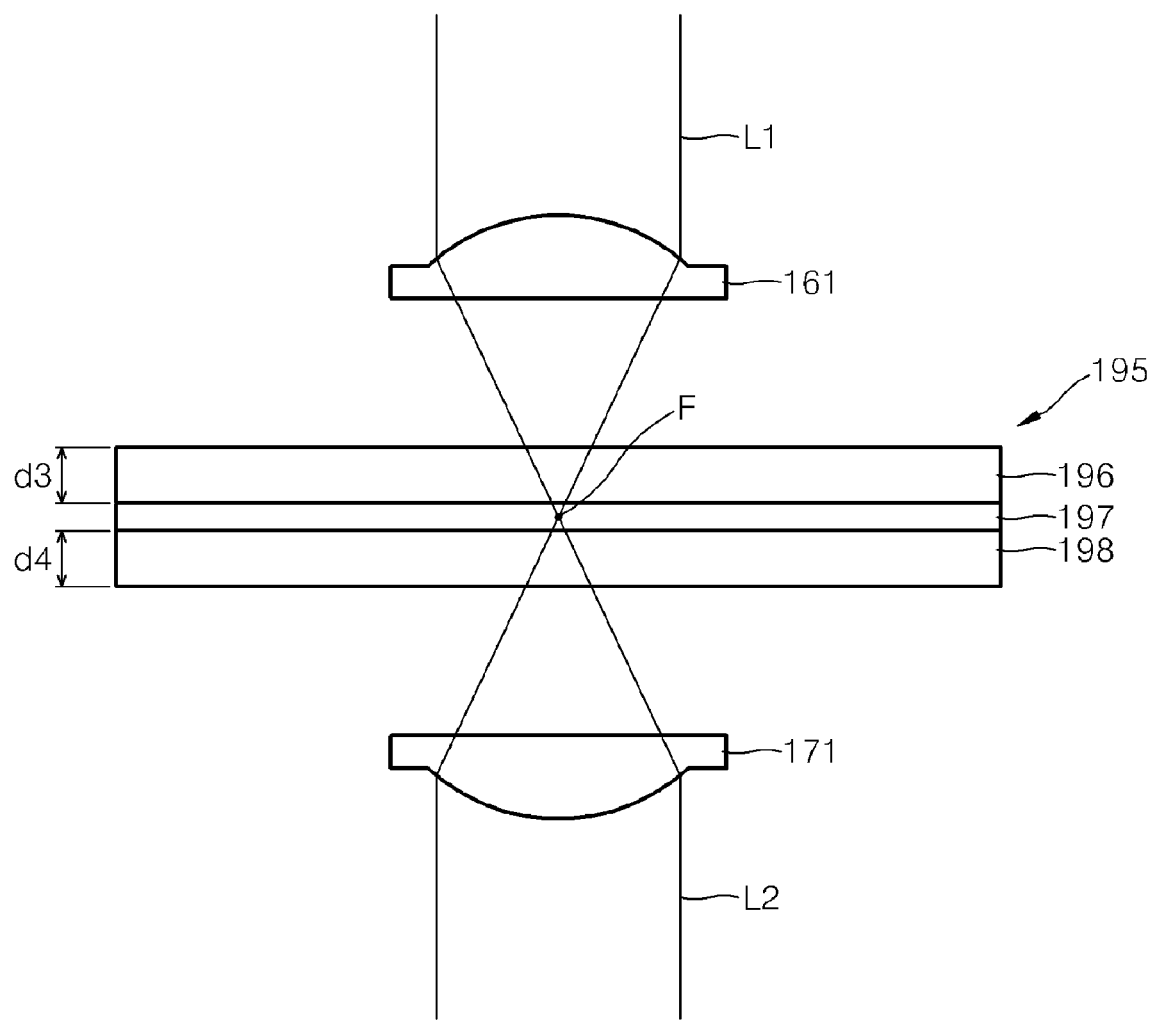
FIG. 3 is a schematic diagram illustrating an optical structure in which a signal beam and a reference beam are emitted by optical systems having identical numerical apertures, according to an embodiment of the present invention.

FIG. 3 is a schematic diagram illustrating an optical structure in which a signal beam and a reference beam are emitted by optical systems having identical numerical apertures, as an example for comparison with the holographic information storage medium 190 of the embodiment illustrated in FIG. 2.

Referring to FIG. 3, the example is practically the same as the embodiment illustrated in FIG. 2 described above, except that the numerical apertures of the optical systems in FIG. 3 are identical to each other. Also, the holographic information storage medium 195 of the example illustrated in FIG. 3 has a structure having first and second transparent substrates 196 and 198 and a recording layer 197 between the two substrates 196 and 198. In this case, if the numerical aperture of the first object lens 161 for focusing the signal beam (L1) becomes the same as the numerical aperture of the second object lens 171 for focusing the reference beam (L2), the thickness (d3) of the first transparent substrate 196 is the same as the thickness (d4) of the second transparent substrate 198. Generally, the thickness of a storage medium is about 1.2 mm considering the mechanical characteristic, and the thickness of the recording layer 192 which is very small when compared with the whole thickness of the storage medium, and can be ignored. Accordingly, the thicknesses (d3 and d4) of the first and second transparent substrates 196 and 197 are each about 0.6 mm.

Generally occurring aberrations include a coma aberration caused by the tilt of a storage medium and a spherical aberration caused by changes in a layer or thickness. Assuming that the thickness of a transparent substrate corresponding to a cover layer is d, the change in the thickness of the transparent substrate is Δd, the numerical aperture is NA, the wavelength is λ, the coma aberration is in proportion to expression 1 below, and the spherical aberration is in proportion to expression 2 below:

$$d \times NA^3 / \lambda \quad (1)$$

$$\Delta d \times NA^4 / \lambda \quad (2)$$

Accordingly, if the numerical aperture NA of an optical system is increased in order to increase a recording capacity, the amount of occurrence of an aberration increases, and in order to compensate for the amount, the optical system is made to be complicated.

For this reason, an aspect of the present invention makes the numerical aperture of the optical system of the signal beam (L1) side different from the numerical aperture of the optical system of the reference beam (L2) side, thereby making the transparent substrate of one side having a smaller numerical aperture thicker, and the transparent substrate of the other side having a greater numerical aperture thinner so as to decrease the amount of occurrence of aberration. In this case, although the spot size of light incident from the side having the smaller numerical aperture is bigger, recording is performed by an interference pattern, and the spot size of light incident from the side having the greater numerical aperture is smaller. Accordingly, even though the spot size of one side increases, the recording capacity does not rapidly decrease. For example, if the numerical aperture of the optical system focusing the reference beam (L2) is made to be bigger than the numerical aperture of the optical system focusing the signal beam (L1) and the thickness (d2) of the second transparent substrate 193 is made to be thinner than the thickness (d1) of the first transparent substrate 191, the amount of occurrence of aberration can be decreased. Also, even though the spot size of the signal beam (L1) is big, the spot size of the reference beam (L2) is small, the interference pattern of the signal beam (L1) and the reference beam (L2) does not rapidly increase, and therefore the recording capacity does not rapidly decrease.

Figure 4:
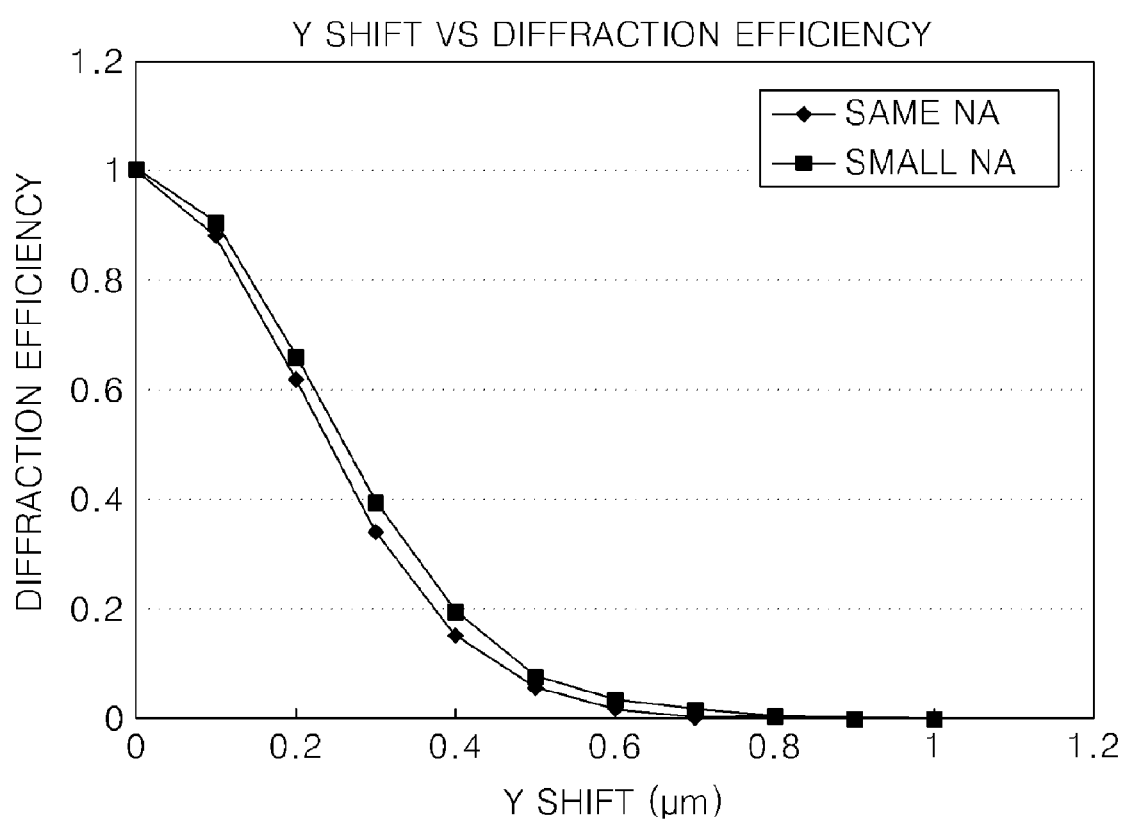
FIG. 4 is a graph illustrating diffraction efficiencies for when numerical apertures are identical and when numerical apertures are different according to an embodiment of the present invention.

FIG. 4 is a graph illustrating changes in diffraction efficiencies, i.e., selectivity, by movement of a light focal point, for when numerical apertures are identical and when numerical apertures are different. In the case where the numerical apertures are identical, the numerical apertures of a signal beam and a reference beam are each 0.6, and where the numerical apertures are different from each other, the numerical apertures of the signal beam and the reference beam are 0.4 and 0.6, respectively. That a recording capacity is determined by selectivity storing holography information is well-known to a person of ordinary skill in the field of the present invention. Referring to FIG. 4, it can be seen that although a difference between the two cases occurs, the difference is very small and a rapid decrease in the recording capacity does not occur. Furthermore, when a photoresist material having a threshold characteristic is employed as a material for the recording layer 192 illustrated in FIG. 2, the decrease in the recording capacity can be effectively controlled.

Figure 5:
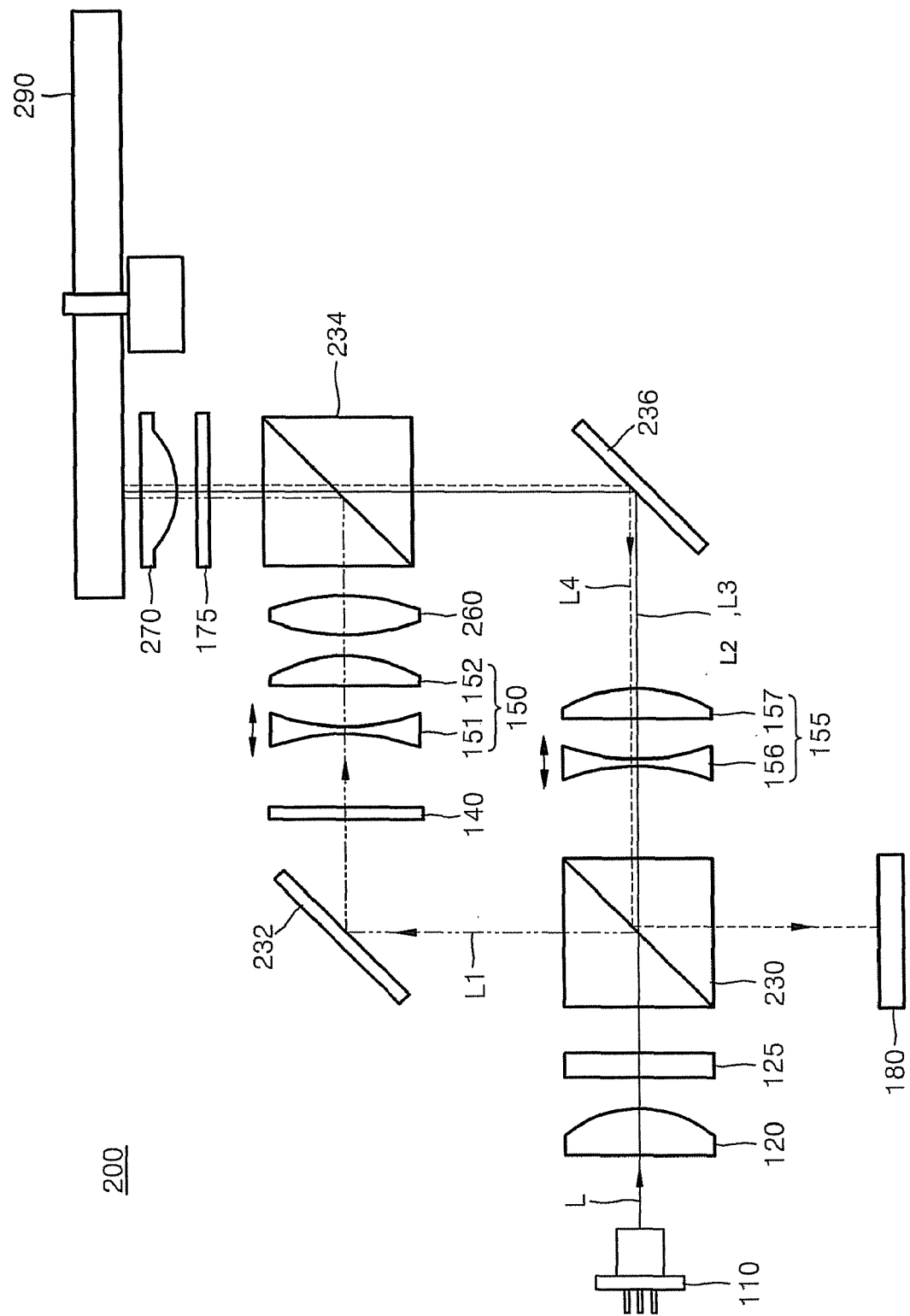
FIG. 5 is a schematic diagram illustrating an optical structure of an apparatus for recording and/or reproducing holographic information according to an embodiment of the present invention.
Figure 6:
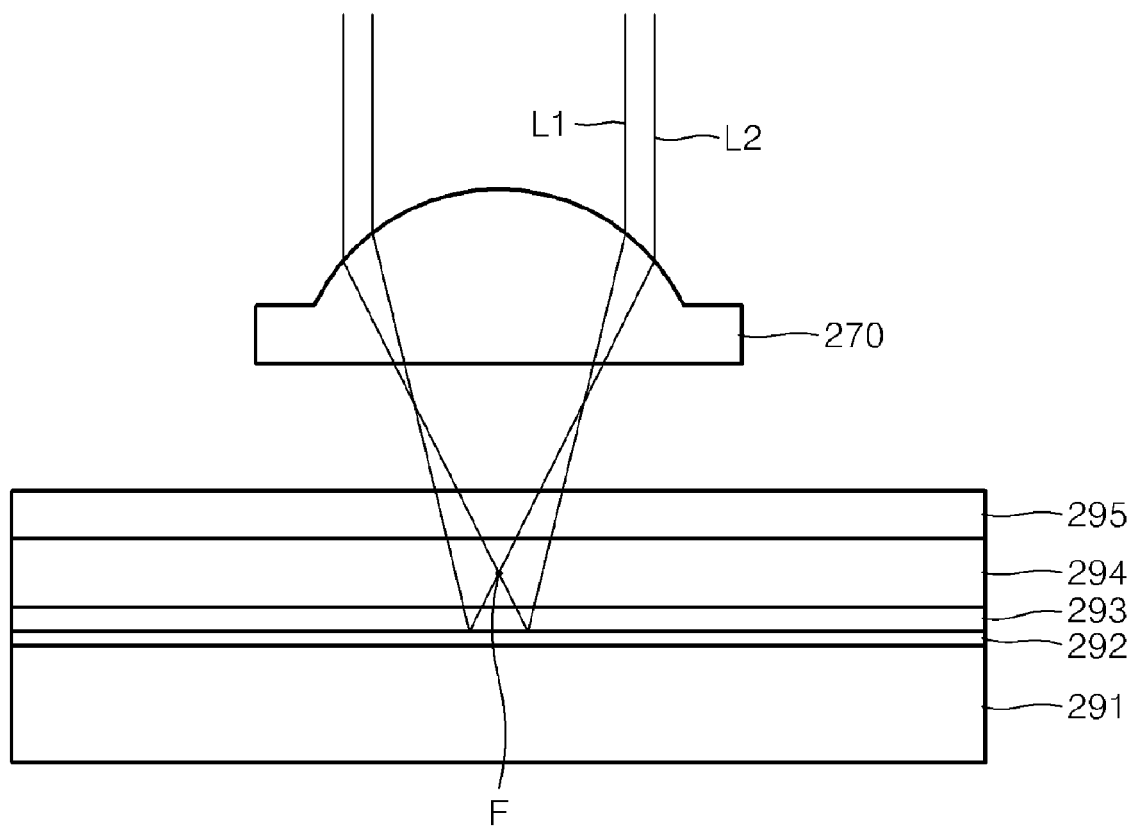
FIG. 6 is a schematic diagram illustrating an optical structure in which a signal beam and a reference beam are emitted onto a holographic information storage medium illustrated in FIG. 5 according to an embodiment of the present invention.

FIG. 5 is a schematic diagram illustrating an optical structure of an apparatus for recording and/or reproducing holographic information according to an embodiment of the present invention, and FIG. 6 is a schematic diagram illustrating only an optical structure in which a signal beam and a reference beam are emitted to a holographic information storage medium illustrated in FIG. 5 according to an embodiment of the present invention.

Referring to FIG. 5, the holographic information recording and/or reproducing apparatus according to the current embodiment records information on a holographic information storage medium 290, and reproduces recorded information thereof. The apparatus includes an optical pickup 200 emitting light to the holographic information storage medium 290 and receiving the emitted light, and a circuit unit (not shown).

The optical pickup 200 includes a light source 110, a collimating lens 120, a polarization conversion device 125, a first and second optical path change device 230 and 234, first and second mirrors 232 and 236, a shutter 140, a numerical aperture conversion device 260, first and second relay lens units 150 and 155, an active quarter wave plate 175, an object lens 270, and an optical detector 180. Furthermore, in the optical pickup 200, a servo optical system (not shown) for performing a servo function can be further disposed. In regard to the optical elements of the current embodiment, the optical elements, which are actually the same as those of the holographic information recording and/or reproducing apparatus described above with reference to FIG. 1, will be indicated by the same reference numbers and a detailed explanation for those elements will be omitted.

The light source 110, the collimating lens 120, the polarization conversion device 125, and the first optical path change device 230 form a light source unit emitting recording and/or reproducing light.

From the light source 110, light (L) polarized in one direction is emitted, and in the polarization conversion device 125, the light (L) is polarization-converted into light having an S polarization component and a P polarization component. Then, the light (L) is incident on the first optical path change device 230. The first optical path change device 230 performs a role of separating optical paths, and may employ a polarization beam splitter in which the transmission and reflection of light changes according to a polarization direction. For example, the first optical path change device 230 may transmit incident P polarization light without any change and reflect incident S polarization light. The P polarization light transmitting the first optical path change device 230 corresponds to a reference beam (L2) in a recording mode and a reproduction beam (L3) in a reproduction mode.

The signal beam (L1) and the reference beam (L2), which are split in the first optical path change device 230, travel through different optical paths and are added together. In the optical path of the signal beam (L1) between the first and second optical change devices 230 and 234, the first mirror 232, the shutter 140, the first relay lens unit 150, and the numerical aperture conversion device 260 are disposed.

In the optical path of the reference beam (L2) between the first and second optical change devices 230 and 234, the second relay lens unit 155 and the second mirror 236 are disposed. In this case, an ordinary refraction lens can be employed as the numerical aperture conversion device 260, which changes the numerical apertures for the signal beam (L1) incident on the object lens 270.

In the recording mode, the signal beam (L1) branching off in the first optical path change device 230 travels through the first mirror 232, the shutter 140, the first relay lens unit 150, and the numerical aperture conversion device 260, and is incident on the second optical path change device 234. The reference beam (L2) branching off in the first optical path change device 230 travels through the second relay lens unit 155 and the second mirror 236, and is incident on the second optical path change device 234.

Meanwhile, in the reproducing mode, the light traveling through the optical path of the signal beam (L1) of the reproduction light split in the first optical path change device 230 is blocked by the shutter 140, and only the light traveling through the optical path of the reference beam (L2) of the reproduction light split in the first optical path change device 230 is incident on the holographic information storage medium 290.

Referring to FIG. 6, a holographic information storage medium according to an embodiment of the present invention, and an optical structure in which a signal beam and a reference beam are emitted onto the holographic information storage medium are illustrated. The holographic information storage medium 290 includes a reflection-type medium having a structure in which a substrate 291, a reflection layer 292, a recording layer 294, and a cover layer 295 are sequentially disposed. A space layer 293 may be further disposed between the recording layer 294 and the reflection layer 292. The cover layer 295 is a transparent medium on which the signal beam (L1), and the reference beam (L2) or the reproduction beam (L3) are incident. The space layer 293 is a layer for securing the distance between the focal point (F) and the reflection layer 292 in relation to the signal beam (L1) reflected from the reflection layer 292 and focused on the focal point (F).

Since only the signal beam (L1) is refracted through the numerical aperture conversion device 260 and the reference beam (L2) is not refracted, the numerical aperture for the signal beam (L1) passing through the object lens 270 can be different from the numerical aperture for the reference beam (L2). That is, the optical system of the current embodiment has a structure in which the numerical aperture for the signal beam (L1) is different from the numerical aperture for the reference beam (L2) influenced by the numerical aperture conversion device 260 which is part of the optical system. In the current embodiment, the numerical aperture for the reference beam (L2) is designed to be greater than the numerical aperture for the signal beam (L1), but the present invention is not limited to this.

Since the numerical aperture for the signal beam (L1) is less than the numerical aperture for the reference beam (L2), the focal distance of the signal beam (L1) can be longer than the focal distance of the reference beam (L2). Accordingly, it can be arranged that the signal beam (L1) is reflected from the reflection layer 295, and then, focused on the focal point (F) of the recording layer 293, while the reference beam (L2) is directly focused on one focal point (F) of the recording layer 293.

As described above, by making the numerical aperture of the optical system for the reference beam (L2) big, the spot size formed on the recording layer of the reference beam (L2) can be made to be small. Accordingly, information can be recorded in a higher density. Also, since the reproduction beam follows the same optical path as that of the reference beam (L2), by making the numerical aperture of the optical system of the reproduction beam big, the information recorded at high density can be easily reproduced. Meanwhile, by making the numerical aperture for the optical system of the signal beam (L1) small, the tolerance for an aberration occurring on the signal beam (L1) side can be increased.

The holographic information recording and/or reproducing apparatuses, methods, and holographic information storage medium according to the various aspects of the present invention are explained above through the embodiments described above. The aspects of the present invention are characterized in that the numerical aperture for the optical system focusing a signal beam is different from that for the optical system focusing a reference beam.

While the aspects of the present invention have been particularly shown and described with reference to general aspects thereof, it will be understood by those of ordinary skill in the art that various changes in form and details may be made therein without departing from the spirit and scope of the present invention as defined by the following claims. The general aspects should be considered in descriptive sense only and not for purposes of limitation. Therefore, the scope of the invention is defined not by the detailed description of the invention but by the appended claims, and all differences within the scope will be construed as being included in the present invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A holographic information recording and/or reproducing apparatus comprising an optical pickup emitting light onto a holographic information storage medium and receiving the emitted light, the optical pickup comprising:
a light source unit configured to emit a signal beam and a reference beam in a recording mode; and a focusing optical system configured to: focus the signal beam and the reference beam on a focal point in the holographic information storage medium so that information is recorded on the holographic information storage medium using an interference pattern formed along a depth direction of the holographic information storage medium in a vicinity of the focal point, a numerical aperture of the focusing optical system for the reference beam being greater than a numerical aperture of the focusing optical system for the signal beam so as to decrease an amount of occurrence of aberration; and vary the focal point along the depth direction of the holographic information storage medium to record information in multiple layers.

2. The apparatus of claim 1, wherein:
the holographic information storage medium comprises a transmission-type holographic information storage medium comprising a first transparent substrate, a second transparent substrate, and a recording layer disposed between the first and second transparent substrates;
the focusing optical system comprises:
a first focusing optical system configured to focus the signal beam on the focal point in the recording layer of the holographic information storage medium through the first transparent substrate; and
a second focusing optical system configured to focus the reference beam on the focal point through the second transparent substrate of the holographic information storage medium; and
a numerical aperture of the first focusing optical system is different from a numerical aperture of the second focusing optical system.

3. The apparatus of claim 2, wherein, in the holographic information storage medium, a thickness of the second transparent substrate is less than a thickness of the first transparent substrate.

4. The apparatus of claim 1, wherein:
the holographic information storage medium comprises a reflection-type holographic information storage medium in which a substrate, a reflection layer, a recording layer, and a cover layer are sequentially disposed; and
the focusing optical system comprises:
a numerical aperture conversion device disposed in any one of optical paths of the signal beam and the reference beam, the numerical aperture conversion device being configured to make the numerical aperture of the focusing optical system for the signal beam different from the numerical aperture of the focusing optical system for the reference beam; and
an object lens configured to make the signal beam and the reference beam incident on the cover layer of the holographic information storage medium.

5. The apparatus of claim 4, wherein, in the focusing optical system:
the signal beam is made to travel through the cover layer of the holographic information storage medium, and is reflected from the reflection layer, and then, is focused on the focal point in the recording layer; and
the reference beam is made to travel through the cover layer of the holographic information storage medium, and then, is directly focused on the focal point in the recording layer.

6. The apparatus of claim 1, wherein the light source unit comprises:
a light source configured to emit a laser beam; and
an optical path change device configured to split the emitted laser beam into the signal beam and the reference beam.

7. The apparatus of claim 6, wherein the optical path change device includes a polarization beam splitter configured to split the signal beam and the reference beam according to a polarization direction.

8. The apparatus of claim 6, further comprising a polarization conversion device disposed between the light source and the optical path change device, the polarization conversion device configured to polarization-convert the light emitted from the light source into light of first and second polarization light perpendicular to each other.

9. The apparatus of claim 1, further comprising:
a shutter disposed on the optical path of the signal beam emitted from the light source unit, the shutter being configured to:
pass light in a recording mode; and
block light in a reproduction mode.

10. The apparatus of claim 1, wherein:
the light source unit is further configured to emit a reproduction beam having a same polarization direction as that of the reference beam in a reproduction mode; and
the light source unit comprises:
a first optical path change device disposed on an optical path of a reproduction beam, the first optical path change device being configured to separate the reproduction beam, which is reflected from the holographic information storage medium, from the optical path of the reproduction beam, which is emitted from the light source unit and incident on the holographic information storage medium; and
an optical detector configured to detect the reproduction beam separated in the first optical path change device and reflected from the holographic information storage medium.

11. The apparatus of claim 1, wherein information recorded on the focal point is recorded as a single bit.

12. The apparatus of claim 1, wherein the focusing optical system comprises a relay lens unit configured to vary the focal point along the depth direction of the holographic information storage medium to record information in multiple layers.

13. A holographic information recording and/or reproducing method recording information on a holographic information storage medium and reproducing recorded information thereof, the method comprising: generating a signal beam and a reference beam in a recording mode; focusing the generated signal beam and reference beam on a focal point of the holographic information storage medium in the recording mode; recording information using an interference pattern formed in a depth direction of the holographic information storage medium and in a vicinity of the focal point; and varying the focal point along the depth direction of the holographic information storage medium to record information in multiple layers, wherein a numerical aperture of a focusing optical system for the reference beam is greater than a numerical aperture of a focusing optical system for the signal beam so as to decrease an amount of occurrence of aberration.

14. The method of claim 13, wherein:
the holographic information storage medium includes a transmission-type holographic information storage medium, the transmission-type holographic information storage medium including a first transparent substrate and a second transparent substrate, and a recording layer disposed between the first and second transparent substrates; and
the signal beam is focused on the focal point through the first transparent substrate of the holographic information storage medium, and the reference beam is focused on the focal point through the second transparent substrate of the holographic information storage medium in order to record information on the focal point.

15. The method of claim 13, wherein:
the holographic information storage medium includes a reflection-type holographic information storage medium, the reflection-type holographic information storage medium including a substrate, a reflection layer, a recording layer, and a cover layer sequentially disposed;
the signal beam and the reference beam are incident on the cover layer of the holographic information storage medium;
the signal beam is reflected from the reflection layer of the holographic information storage medium and focused on the focal point in the recording layer; and
the reference beam is directly focused on the focal point.

16. The method of claim 13, wherein the signal beam and the reference beam are split according to a polarization direction.

17. The method of claim 13, wherein, in a reproduction mode, a reproduction beam having a same polarization direction as that of the reference beam is emitted to the holographic information storage medium along an optical path of the reference beam.

18. The method of claim 13, wherein information recorded on the focal point is recorded as a single bit.

19. A holographic information storage medium comprising:
a first transparent substrate; a second transparent substrate; and
a recording layer disposed between the first and second transparent layer and formed by a photoresist material on which holographic information is recorded, wherein a thickness of the second transparent substrate is less than a thickness of the first transparent substrate, the first transparent substrate having a distance to a signal beam that is less than distance from the second transparent substrate to a reference beam so as to decrease an amount of occurrence of aberration.

20. The holographic information storage medium of claim 19, further comprising a servo layer containing servo information located between the first transparent substrate and the recording layer.

21. The holographic information storage medium of claim 19, further comprising a servo layer containing servo information located between the second transparent substrate and the recording layer.

* * * * *